United States Patent
Jeong

(10) Patent No.: US 10,572,155 B2
(45) Date of Patent: Feb. 25, 2020

(54) DATA STORAGE DEVICE AND OPERATING METHOD THEREOF

(71) Applicant: SK hynix Inc., Gyeonggi-do (KR)

(72) Inventor: Beom Rae Jeong, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 60 days.

(21) Appl. No.: 15/829,164

(22) Filed: Dec. 1, 2017

(65) Prior Publication Data

US 2018/0335950 A1 Nov. 22, 2018

(30) Foreign Application Priority Data

May 19, 2017 (KR) .................. 10-2017-0062024

(51) Int. Cl.
*G06F 12/00* (2006.01)
*G06F 3/06* (2006.01)

(52) U.S. Cl.
CPC ............ *G06F 3/0608* (2013.01); *G06F 3/065* (2013.01); *G06F 3/0619* (2013.01); *G06F 3/0625* (2013.01); *G06F 3/0656* (2013.01); *G06F 3/0659* (2013.01); *G06F 3/0679* (2013.01)

(58) Field of Classification Search
None
See application file for complete search history.

(56) References Cited

U.S. PATENT DOCUMENTS

2008/0209266 A1* 8/2008 Lee .................. G06F 11/141
714/16
2011/0283050 A1* 11/2011 Pasquale ............ G06F 12/0246
711/103

FOREIGN PATENT DOCUMENTS

KR 100823175 4/2008

* cited by examiner

*Primary Examiner* — Baboucarr Faal
(74) *Attorney, Agent, or Firm* — IP & T Group LLP

(57) ABSTRACT

A data storage device includes a nonvolatile memory device; and a controller including a plurality of buffers and suitable for, when a program fail occurs in the nonvolatile memory device, transmitting exchange data stored in an optional exchange buffer among the plurality of buffers, to the nonvolatile memory device, storing and updating, in the exchange buffer, failed program data received from the nonvolatile memory device, and transmitting the updated program data to the nonvolatile memory device.

15 Claims, 13 Drawing Sheets

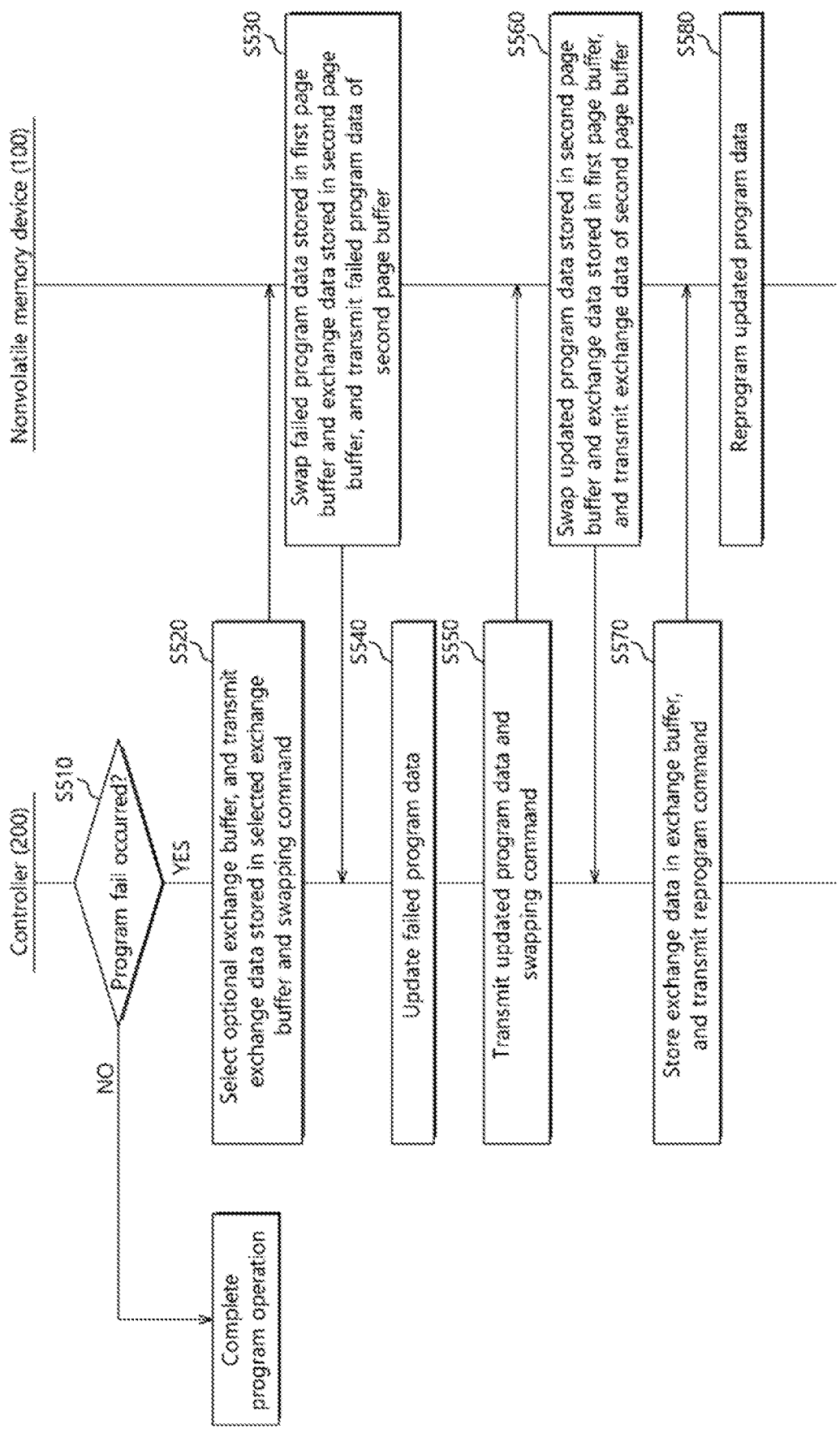

DATA STORAGE DEVICE AND OPERATING METHOD THEREOF

CROSS-REFERENCES TO RELATED APPLICATION

The present application claims priority to Korean application number 10-2017-0062024, filed on May 19, 2017, which is incorporated herein by reference in its entirety.

BACKGROUND

1. Technical Field

Various embodiments generally relate to a semiconductor device, and, more particularly, to a data storage device and an operating method thereof.

2. Related Art

Recently, the paradigm for the computer environment has been converted into ubiquitous computing so that computer systems can be used anytime and anywhere. Due to this fact, the use of portable electronic devices such as mobile phones, digital cameras, and laptop computers has rapidly increased. In general, such portable electronic devices use data storage devices that use a memory device. A data storage device is used to store data to be used in a portable electronic device.

Since there is no mechanical driving part, data storage devices using a memory device provides excellent stability and durability, high information access speed, and low power consumption. Data storage devices having such advantages include a universal serial bus (USB) memory device, memory cards having various interfaces, a universal flash storage (UFS) device, and a solid state drive (SSD).

SUMMARY

Various embodiments are directed to a data storage device with improved memory usage efficiency and an operating method thereof.

In an embodiment, a data storage device may include: a nonvolatile memory device; and a controller including a plurality of buffers and suitable for, when a program fail occurs in the nonvolatile memory device, transmitting exchange data stored in an optional exchange buffer among the plurality of buffers, to the nonvolatile memory device, storing and updating, in the exchange buffer, failed program data received from the nonvolatile memory device, and transmitting the updated program data to the nonvolatile memory device.

In an embodiment, a method for operating a data storage device may include: determining whether a program fail has occurred in a nonvolatile memory device; selecting an optional exchange buffer and exchanging exchange data stored in the selected exchange buffer with failed program data stored in the nonvolatile memory device, when the program fail has occurred; updating the failed program data; exchanging updated program data with the exchange data stored in the nonvolatile memory device; and performing reprogram by using the updated program data.

In an embodiment, a method for operating a data storage device including a nonvolatile memory device including a memory cell array and a page buffer, and a controller including a buffer memory, may include: exchanging a failed program data in the page buffer with an exchange data in the buffer memory; updating the failed program data stored in the buffer memory; and reprograming the updated data into the memory cell array by exchanging the updated data with the exchange data in the page buffer.

According to the embodiments, it is not necessary to separately provide a space for reading back failed program data in a random access memory when a program fail occurs.

Due to this fact, the usage efficiency of the random access memory may be improved.

BRIEF DESCRIPTION OF THE DRAWINGS

FIG. 5 is a flow chart describing a method for operating a data storage device in accordance with an embodiment of the present disclosure.

DETAILED DESCRIPTION

Hereinafter, a data storage device and an operating method thereof will be described below with reference to the accompanying drawings through various example embodiments of the present disclosure.

Figure 1:
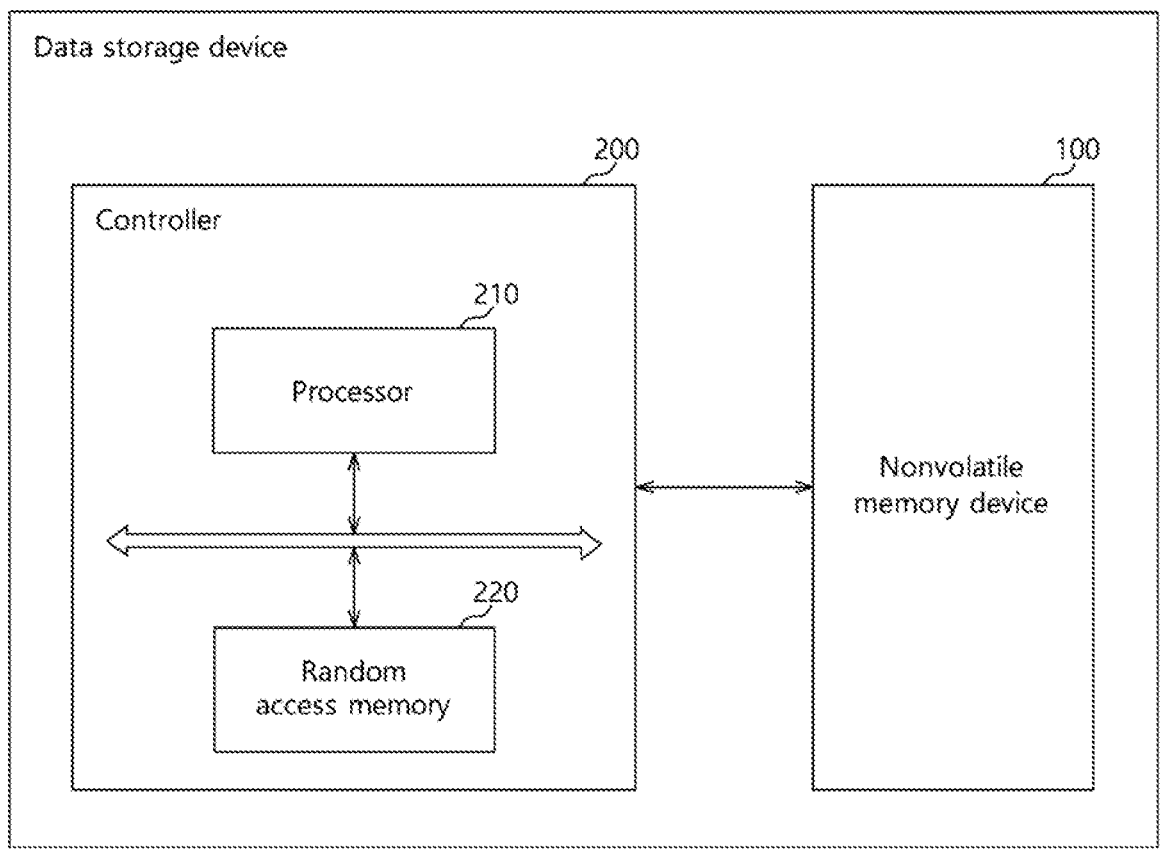
FIG. 1 is a block diagram illustrating an example of a data storage device in accordance with an embodiment of the present disclosure.
Figure 2:
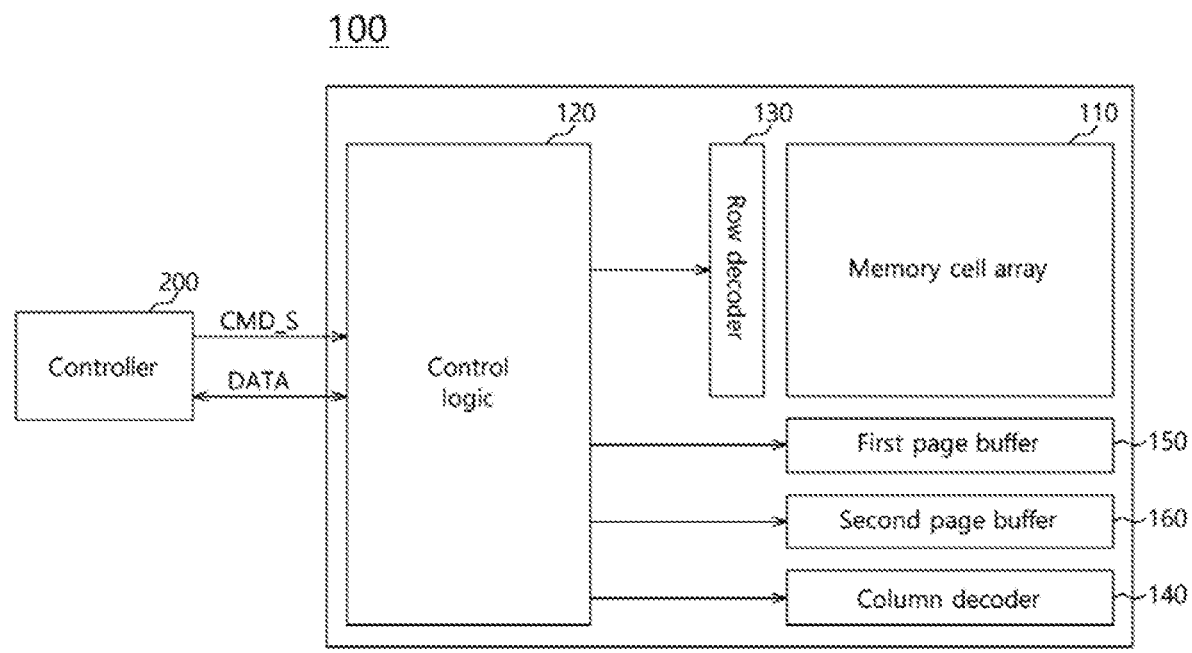
FIG. 2 is a block diagram schematically illustrating an example of a configuration of the nonvolatile memory device shown in FIG. 1.
Figure 3:
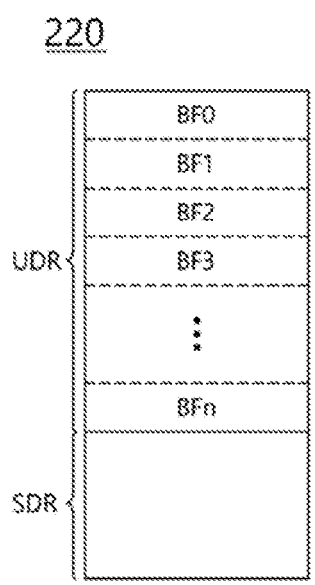
FIG. 3 is a block diagram conceptually illustrating an example of a configuration of the random access memory shown in FIG. 1.

FIG. 1 is a block diagram illustrating an example of a data storage device in accordance with an embodiment of the present disclosure. FIG. 2 is a block diagram schematically illustrating an example of the configuration of the nonvolatile memory device shown in FIG. 1. FIG. 3 is a block diagram conceptually illustrating an example of the configuration of the random access memory shown in FIG. 1.

Referring to FIG. 1, a data storage device 10 may store data to be accessed by a host device (not shown) such as a mobile phone, an MP3 player, a laptop computer, a desktop computer, a game player, a TV, an in-vehicle infotainment system, and so forth. The data storage device 10 may be referred to as a memory system.

The data storage device 10 may be manufactured as any one of various kinds of storage devices according to the protocol of an interface which is electrically coupled with the host device. For example, the data storage device 10 may be any one of various kinds of storage devices such as a solid state drive, a multimedia card in the form of an MMC, an eMMC, an RS-MMC and a micro-MMC, a secure digital card in the form of an SD, a mini-SD and a micro-SD, a universal serial bus (USB) storage device, a universal flash storage (UFS) device, a Personal Computer Memory Card International Association (PCMCIA) card type storage device, a peripheral component interconnection (PCI) card type storage device, a PCI express (PCI-E) card type storage device, a compact flash (CF) card, a smart media card, a memory stick, and so forth.

The data storage device 10 may be manufactured as any one among various kinds of package types. For example, the data storage device 10 may be manufactured as any one of various kinds of package types such as a package-on-package (POP), a system-in-package (SIP), a system-on-chip (SOC), a multi-chip package (MCP), a chip-on-board (COB), a wafer-level fabricated package (WFP) and a wafer-level stack package (WSP).

The data storage device 10 may include a nonvolatile memory device 100 and a controller 200.

The nonvolatile memory device 100 may operate as the storage medium of the data storage device 10. The nonvolatile memory device 100 may be configured by any one of various types of nonvolatile memory devices such as a NAND flash memory device, a NOR flash memory device, a ferroelectric random access memory (FRAM) using a ferroelectric capacitor, a magnetic random access memory (MRAM) using a tunneling magneto-resistive (TMR) layer, a phase change random access memory (PRAM) using a chalcogenide alloy, and a resistive random access memory (RERAM) using a transition metal compound, depending on memory cells.

Referring to FIG. 2, the nonvolatile memory device 100 may include a memory cell array 110, a control logic 120, a row decoder 130, a column decoder 140, a first page buffer 150, and a second page buffer 160. However, it is to be noted that components included in the nonvolatile memory device 100 are not limited thereto.

The memory cell array 110 may include a plurality of memory cells (not shown), which are respectively disposed at regions where a plurality of bit lines (not shown) and a plurality of word lines (not shown) intersect with each other. For example, each memory cell may be a single level cell (SLC) storing one bit, a multi-level cell (MLC) capable of storing 2-bit data, a triple level cell (TLC) capable of storing 3-bit data or a quad level cell (QLC) capable of storing 4-bit data.

The memory cell array 110 may include at least one among single level cells, multi-level cells, triple level cells, and quad level cells. For example, the memory cell array 110 may include memory cells of a two-dimensional horizontal structure or memory cells of a three-dimensional vertical structure.

Figure 4A:
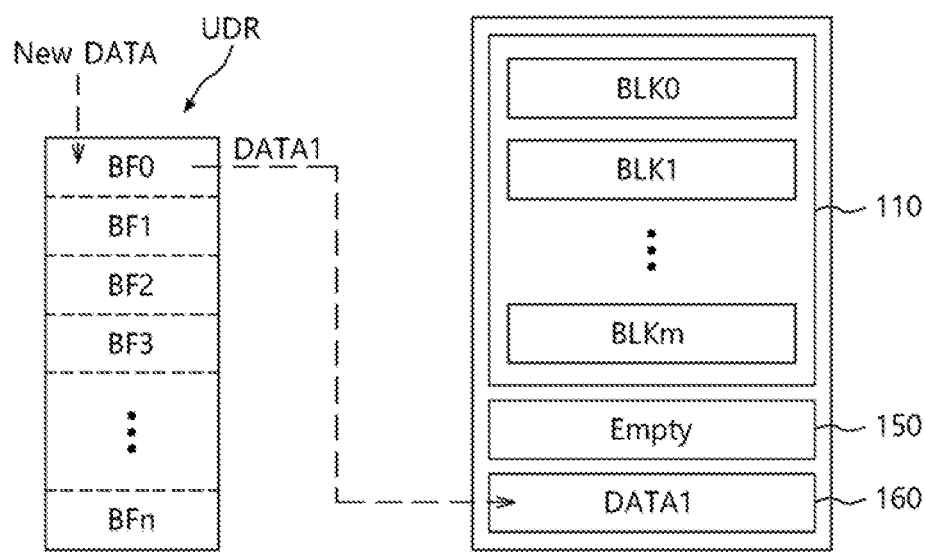
FIGS. 4A to 4I are diagrams describing a process of performing reprogram when a program fail occurs in accordance with an embodiment of the present disclosure.

The control logic 120 may control general operations associated with program (or write), read, and erase operations of the nonvolatile memory device 100. For example, the control logic 120 may control a program operation and a read operation to be performed in the memory cell array 110, in response to a program command and a read command received from the controller 200. Also, the control logic 120 may control an erase operation to be performed in the memory cell array 110, in response to an erase command received from the controller 200. Without a limiting sense, a program operation and a read operation may be performed by the unit of page, and an erase operation may be performed by the unit of block. As shown in FIG. 4A, the memory cell array 110 may include a plurality of blocks, and each block may include a plurality of pages.

The control logic 120 may transmit a row address for selecting a word line and a column address for selecting a bit line to the row decoder 130 and the column decoder 140, respectively, based on an address received from the controller 200.

The row decoder 130 may select any one among a plurality of word lines coupled with the memory cell array 110. For example, the row decoder 130 may select any one word line among the plurality of word lines, based on a row address received from the control logic 120.

The column decoder 140 may select any one among a plurality of bit lines coupled with the memory cell array 110. For example, the column decoder 140 may select any one bit line among the plurality of bit lines, based on a column address received from the control logic 120.

The first page buffer 150 and the second page buffer 160 may be coupled with the memory cell array 110 through the plurality of bit lines. The first page buffer 150 and the second page buffer 160 may temporarily store program data to be stored in the memory cell array 110 or read data read out from the memory cell array 110.

In the present embodiment, the first page buffer 150 and the second page buffer 160 may correspond to a main buffer and a cache buffer, respectively, but are not limited thereto. For the sake of convenience in explanation, it is assumed that, in a program operation, program data is stored first in the second page buffer 160 from a random access memory 220 of the controller 200, and the program data stored in the second page buffer 160 is moved to the first page buffer 150 and is then stored in the memory cell array 110.

While FIG. 1 illustrates that the data storage device 10 includes one nonvolatile memory device 100, the present disclosure is not limited thereto, and the data storage device 10 may include a plurality of nonvolatile memory devices. The present embodiment may be applied in substantially the same manner to a data storage device which includes a plurality of nonvolatile memory devices.

The controller 200 may control general operations of the data storage device 10 through driving of a firmware or a software loaded in the random access memory 220. The controller 200 may decode and drive a code type instruction or algorithm such as a firmware or a software. The controller 200 may be embodied in the form of a hardware or in the combined form of a hardware and a software.

The controller 200 may include a processor 210 and the random access memory 220. While not shown in FIG. 1, the controller 200 may further include a host interface unit that interfaces the host device and the data storage device 10 in correspondence to the protocol of the host device. For example, the host interface unit may communicate with the host device through any one of universal serial bus (USB), universal flash storage (UFS), multimedia card (MMC), parallel advanced technology attachment (PATA), serial advanced technology attachment (SATA), small computer system interface (SCSI), serial attached SCSI (SAS), peripheral component interconnection (PCI) and PCI express (PCI-E) protocols.

Also, the controller 200 may further include a memory control unit (not shown) that controls the operation of the nonvolatile memory device 100 according to control of the processor 210. The memory control unit may be referred to as a memory interface unit.

The random access memory 220 may store a firmware or a software to be driven by the processor 210. Further, the random access memory 220 may store data necessary for driving the firmware or the software. That is to say, the random access memory 220 may operate as a working memory of the processor 210.

The random access memory 220 may temporarily store data to be transmitted from the host device to the nonvolatile memory device 100 or data to be transmitted from the nonvolatile memory device 100 to the host device. In other words, the random access memory 220 may operate as a buffer memory.

For example, referring to FIG. 3, the random access memory 220 may be configured by a system data region SDR that stores a firmware or a software to be driven by the processor 210, and a user data region UDR that temporarily stores program data to be transmitted to the nonvolatile memory device 100 from the host device or read data to be transmitted to the host device from the nonvolatile memory device 100.

The user data region UDR may include a plurality of buffers BF0 to BFn. Program data or read data may be stored in each of the buffers BF0 to BFn. After the program data or read data stored in the user data region UDR of the random access memory 220 is transmitted to the nonvolatile memory device 100 or the host device, a corresponding buffer may be in an empty state, and new program data or read data may be temporarily stored in the corresponding buffer.

The processor 210 may control general operations of the controller 200. The processor 210 may drive the code type instruction or algorithm, that is, a software, loaded in the random access memory 220, and control operations of internal function blocks therein. The processor 210 may include function blocks (not shown) necessary for driving the software. The processor 210 may be configured by a micro control unit (MCU) or a central processing unit (CPU).

For example, the processor 210 may provide a program command in response to a program request of the host device, to the nonvolatile memory device 100. For example, the program command may include a control signal corresponding to the program request of the host device and a logical address to be programmed and program data transmitted from the host device. Moreover, the processor 210 may provide a read command in response to a read request of the host device, to the nonvolatile memory device 100. For example, the read command may include a control signal corresponding to the read request of the host device and a logical address to be read.

After providing the program command or the read command to the nonvolatile memory device 100, the processor 210 may check whether the operation of a corresponding command is a pass or a fail. For example, after providing a command to be executed to the nonvolatile memory device 100, the processor 210 may transmit a state information request command, which requests a state information of a corresponding operation, to the nonvolatile memory device 100, and the nonvolatile memory device 100 may provide a state information in response to the state information request command, to the processor 210. The processor 210 may determine whether the operation of a corresponding operation is a pass or a fail, based on a received state information.

In the case where a command transmitted from the processor 210 to the nonvolatile memory device 100 is a program command, if it is determined that a program operation is a pass, the processor 210 may end the program operation.

However, if it is determined that the program operation is a fall, the processor 210 may exchange exchange data stored in an optional exchange buffer BF among the plurality of buffers BF0 to BFn in the user data region UDR of the random access memory 210 and failed program data stored in the nonvolatile memory device 100, update the failed program data, and then, exchange again updated program data and the exchange data stored in the nonvolatile memory device 100. The updated program data may be reprogrammed in the nonvolatile memory device 100.

The processor 210 may provide a swapping command CMD_S (see FIG. 2) for swapping the exchange data and the failed program data (or the updated program data), to the nonvolatile memory device 100. The control logic 120 of the nonvolatile memory device 100 may swap the data temporarily stored in the first page buffer 150 and the data temporarily stored in the second page buffer 160, in response to the swapping command CMD_S.

A reprogram operation in accordance with the embodiment of the present disclosure will be described in more detail below with reference to FIGS. 4A to 4I.

FIGS. 4A to 4I are diagrams describing a process of performing reprogram when a program fail occurs in accordance with an embodiment of the present disclosure.

Referring to FIG. 4A, if a program request is received from the host device, the processor 210 may transmit a program command, that is, a control signal corresponding to the program request, and program data DATA1, to the nonvolatile memory device 100. The program data DATA1 may be stored in the second page buffer 160 of the nonvolatile memory device 100.

At this time, in the random access memory 220, the buffer BF0 in which the program data DATA1 was stored may be in an empty state, and new data New DATA may be stored in the empty buffer BF0. The new data New DATA may be data transmitted from the host device or data transmitted from the nonvolatile memory device 100.

Figure 4B:
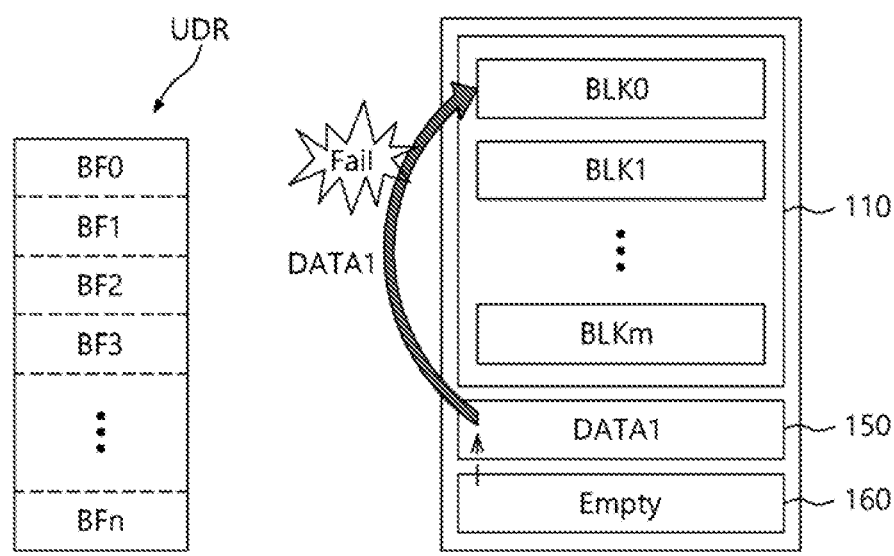

Referring to FIG. 4B, the program data DATA1 stored in the second page buffer 160 of the nonvolatile memory device 100 may be moved to and stored in the first page buffer 150, and may then be programmed in a block (for example, a block BLK0) corresponding to an address to be programmed. At this time, the second page buffer 160 may be in an empty state.

Figure 4C:
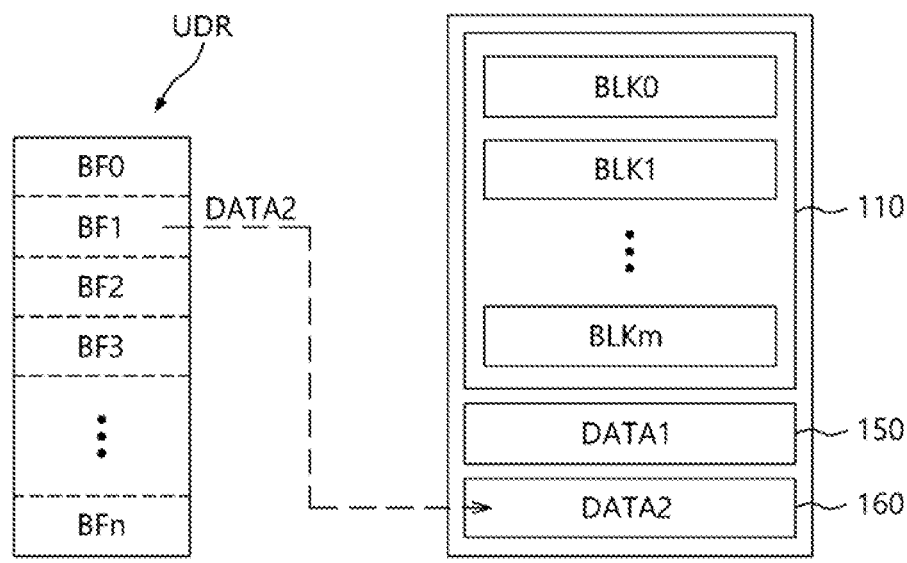

If a program fall occurs, the processor 210 may select an optional exchange buffer (for example, the buffer BF1) in the user data region UDR of the random access memory 220, and may transmit exchange data (for example, exchange data DATA2) stored in the exchange buffer BF1, to the nonvolatile memory device 100, as shown in FIG. 4C. The exchange data DATA2 may be stored in the second page buffer 160.

Figure 4D:
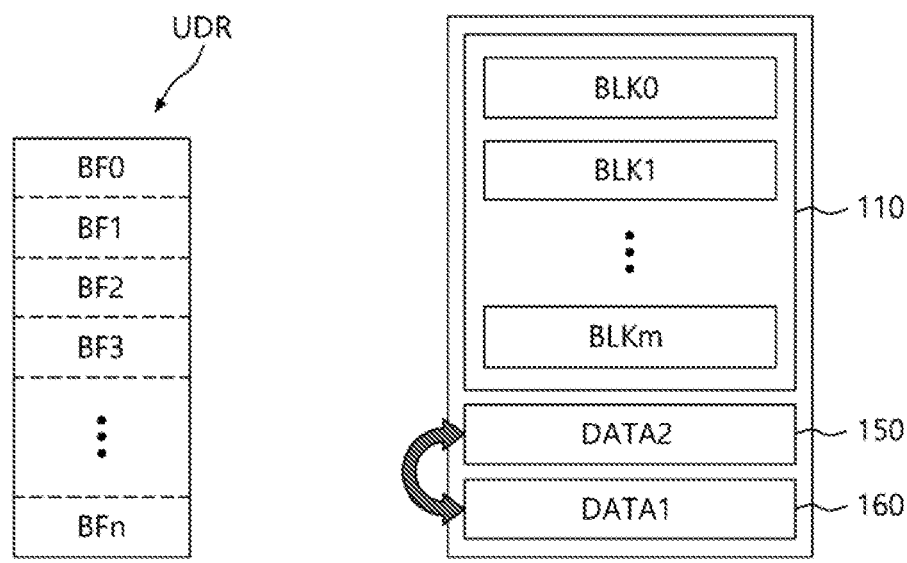
Figure 4E:
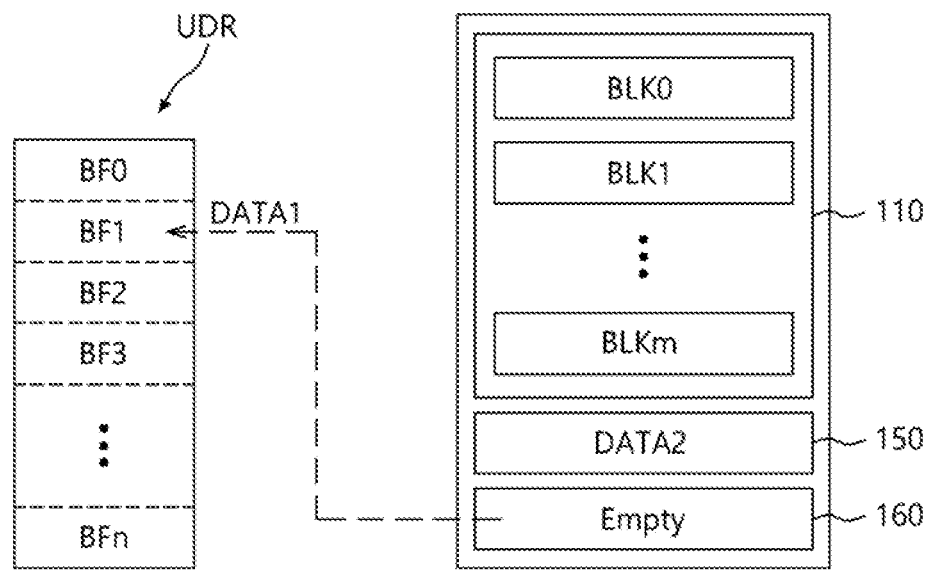

Also, the processor 210 may transmit a swapping command CMD_S to the nonvolatile memory device 100, and the control logic 120 may swap the failed program data DATA1 stored in the first page buffer 150 and the exchange data DATA2 stored in the second page buffer 160, in response to the received swapping command CMD_S, as shown in FIG. 4D. As shown in FIG. 4E, the control logic 120 may transmit the failed program data DATA1 stored in the second page buffer 160, to the controller 200. The processor 210 may store the received failed program data DATA1 in the exchange buffer BF1, which is empty.

Figure 4F:
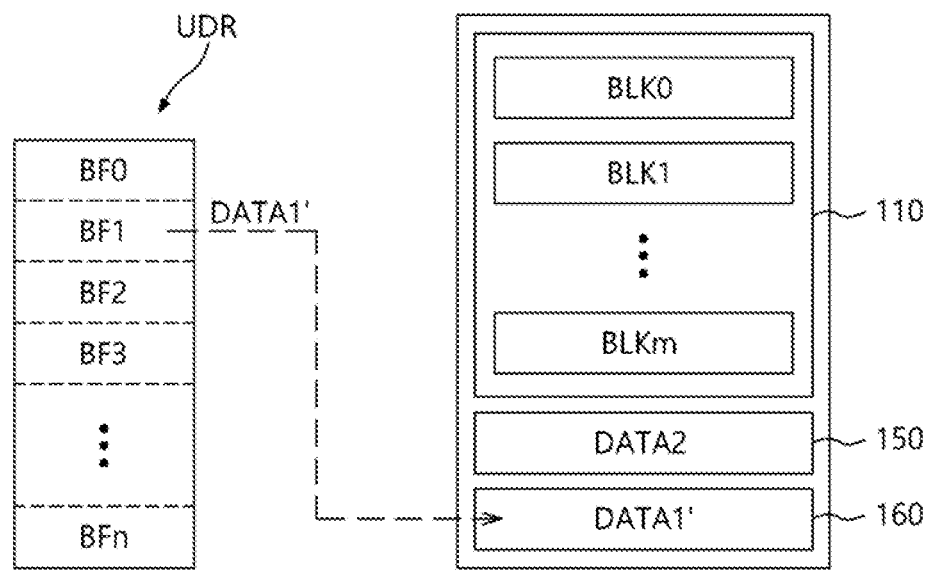

As shown in FIG. 4F, the processor 210 may update the program data DATA1 by modifying meta information on the failed program data DATA1 stored in the exchange buffer BF1, and may transmit updated program data DATA1' to the second page buffer 160 of the nonvolatile memory device 100. The updated program data DATA1' may be stored in the second page buffer 160.

The meta information to be modified may include, for example, an ID of data, an error correction code (ECC), a randomization seed, a sequence number and so forth, but are not limited thereto. Since the respective meta information correspond to a technology well known in the art, detailed descriptions thereof will be omitted herein.

Figure 4G:
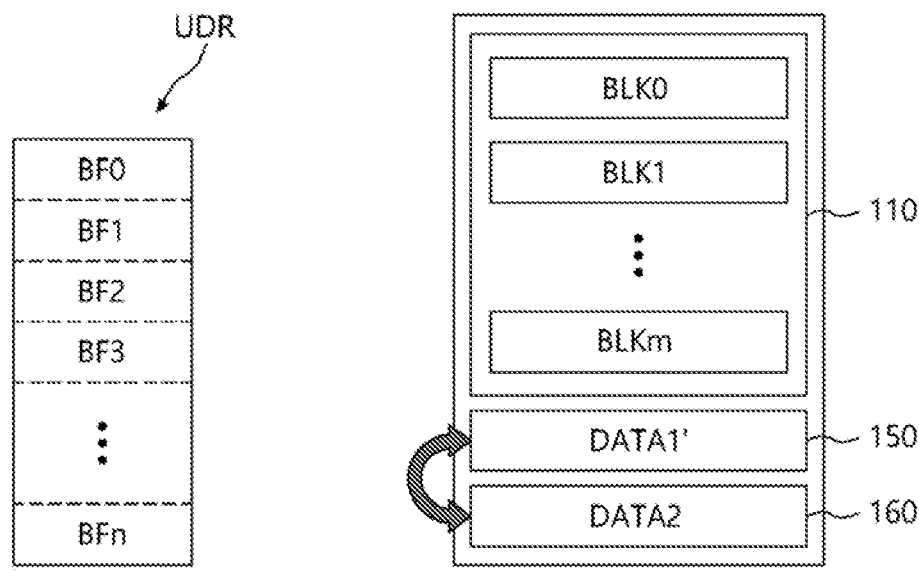
Figure 4H:
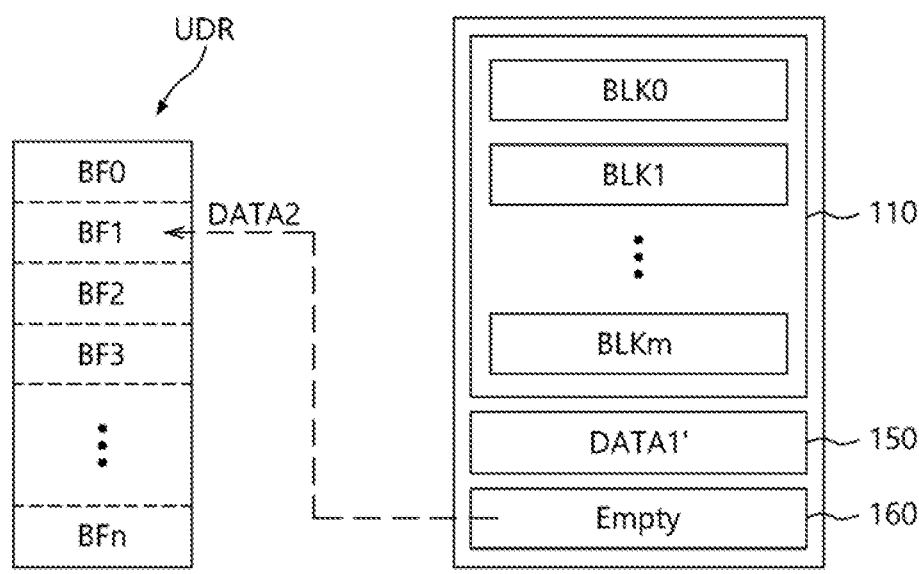

Also, the processor 210 may transmit a swapping command CMD_S to the nonvolatile memory device 100, and the control logic 120 may swap the exchange data DATA2 stored in the first page buffer 150 and the updated program data DATA1' stored in the second page buffer 160, in response to the received swapping command CMD_S, as shown in FIG. 4G. Further, as shown in FIG. 4H, the control logic 120 may transmit the exchange data DATA2 stored in the second page buffer 160, to the controller 200, and the processor 210 may store the received exchange data DATA2 in the buffer in which the exchange data DATA2 was stored originally, that is, the exchange buffer BF1.

Figure 4I:
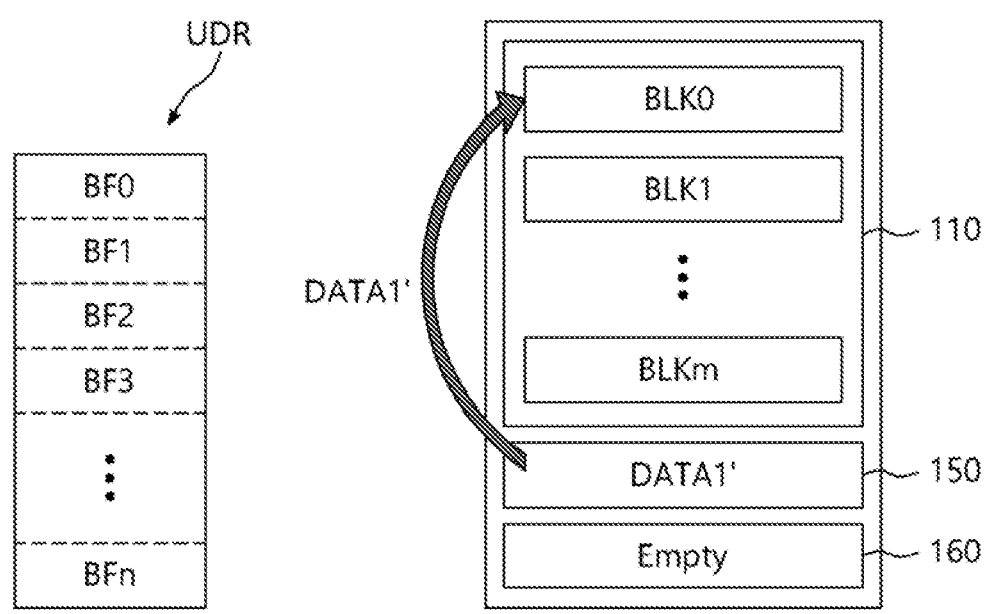

As shown in FIG. 4I, the control logic 120 may reprogram the updated program data DATA1' stored in the first page buffer 150, in a block (for example, a block BLK1) other than the block (for example, the block BLK0) in which the program fail has occurred, according to the control of the processor 210.

In this way, since it is not necessary to separately provide a space for reading back failed program data when a program fail occurs in the random access memory 220, the usage efficiency of the random access memory 220 is improved in the present embodiment.

FIG. 5 is a flow chart describing a method for operating a data storage device in accordance with an embodiment of the present disclosure.

At step S510, the processor 210 may determine whether a program fall has occurred. If a program fail has not occurred, a program operation may be completed. Meanwhile, if a program fail has occurred, the process may proceed to step S520.

At the step S520, the processor 210 may select an optional exchange buffer in the user data region UDR of the random access memory 220, and may transmit exchange data stored in the selected exchange buffer, to the nonvolatile memory device 100. The exchange data may be stored in the second page buffer 160 of the nonvolatile memory device 100.

Also, the processor 210 may transmit a swapping command CMD_S (see FIG. 2) to the nonvolatile memory device 100.

At step S530, the control logic 120 of the nonvolatile memory device 100 may swap the exchange data stored in the second page buffer 160 and the failed program data stored in the first page buffer 150 in response to the received swapping command CMD_S, and may transmit the failed program data stored in the second page buffer 160, to the controller 200.

At step S540, the processor 210 may store the failed program data received from the nonvolatile memory device 100, in the selected exchange buffer, and may update the failed program data to an updated program data by modifying meta information on the failed program data.

At step S550, the processor 210 may transmit the updated program data to the nonvolatile memory device 100. The updated program data may be stored in the second page buffer 160 of the nonvolatile memory device 100. Moreover, the processor 210 may transmit a swapping command CMD_S to the nonvolatile memory device 100.

At step S560, the control logic 120 of the nonvolatile memory device 100 may swap the updated program data stored in the second page buffer 160 and the exchange data stored in the first page buffer 150 in response to the received swapping command CMD_S, and may transmit the exchange data stored in the second page buffer 160, to the controller 200.

At step S570, the processor 210 may store the exchange data received from the nonvolatile memory device 100, in the selected exchange buffer. Furthermore, the processor 210 may transmit a reprogram command for performing reprogram of the updated program data, to the nonvolatile memory device 100.

At step S580, the control logic 120 may perform a reprogram operation of reprogramming the updated program data stored in the first page buffer 150, in a block other than a block in which the program fail has occurred, in response to the received reprogram command.

Figure 6:
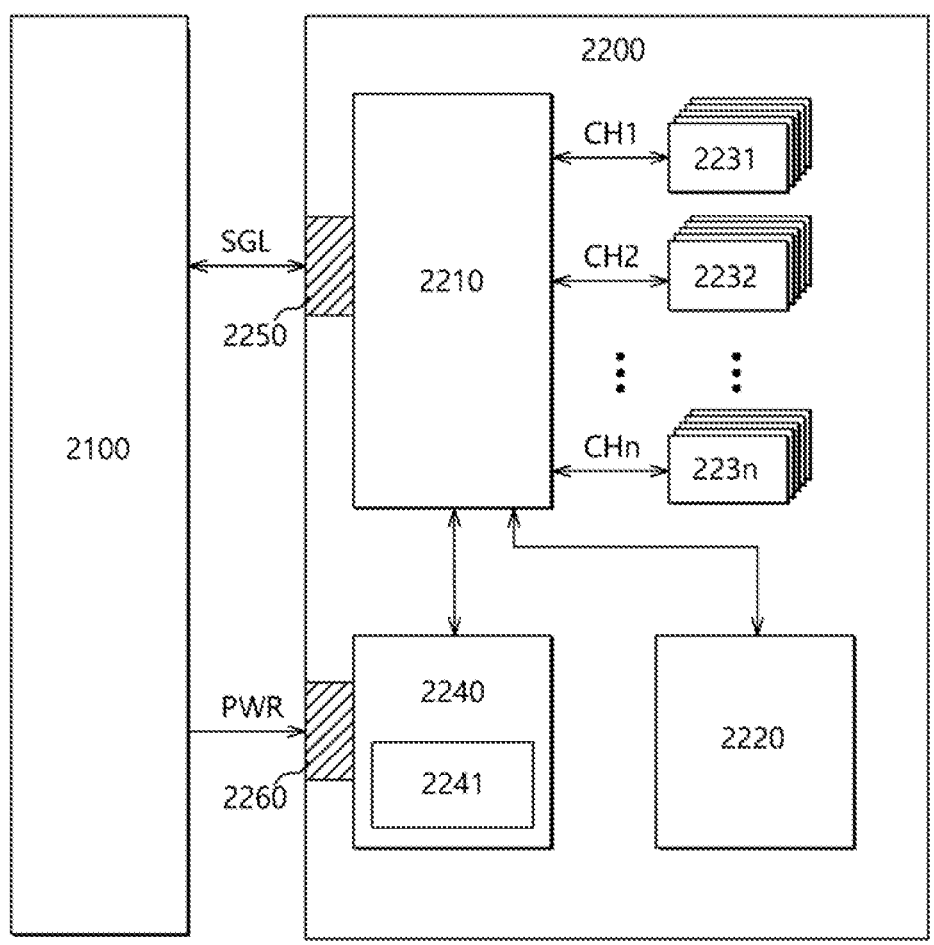
FIG. 6 is a diagram illustrating an example of a data processing system including a solid state drive (SSD) in accordance with an embodiment of the present disclosure.

FIG. 6 is a diagram illustrating an example of a data processing system including a solid state drive (SSD) according to an embodiment of the present disclosure. Referring to FIG. 6, a data processing system 2000 may include a host apparatus 2100 and a SSD 2200.

The SSD 2200 may include a controller 2210, a buffer memory device 2220, nonvolatile memory devices 2231 to 223n, a power supply 2240, a signal connector 2250, and a power connector 2260.

The controller 2210 may control an overall operation of the SSD 2220.

The buffer memory device 2220 may temporarily store data to be stored in the nonvolatile memory devices 2231 to 223n. The buffer memory device 2220 may temporarily store data read from the nonvolatile memory devices 2231 to 223n. The data temporarily stored in the buffer memory device 2220 may be transmitted to the host apparatus 2100 or the nonvolatile memory devices 2231 to 223n according to control of the controller 2210.

The nonvolatile memory devices 2231 to 223n may be used as a storage medium of the SSD 2200. The nonvolatile memory devices 2231 to 223n may be coupled to the controller 2210 through a plurality of channels CH1 to CHn. One or more nonvolatile memory devices may be coupled to one channel. The nonvolatile memory devices coupled to the one channel may be coupled to the same signal bus and the same data bus.

The power supply 2240 may provide power PWR input through the power connector 2260 to the inside of the SSD 2200. The power supply 2240 may include an auxiliary power supply 2241. The auxiliary power supply 2241 may supply the power so that the SSD 2200 is normally terminated even when sudden power-off occurs. The auxiliary power supply 2241 may include large capacity capacitors capable of charging the power PWR.

The controller 2210 may exchange a signal SGL with the host apparatus 2100 through the signal connector 2250. The signal SGL may include a command, an address, data, and the like. The signal connector 2250 may be configured of various types of connectors according to an interfacing method between the host apparatus 2100 and the SSD 2200.

Figure 7:
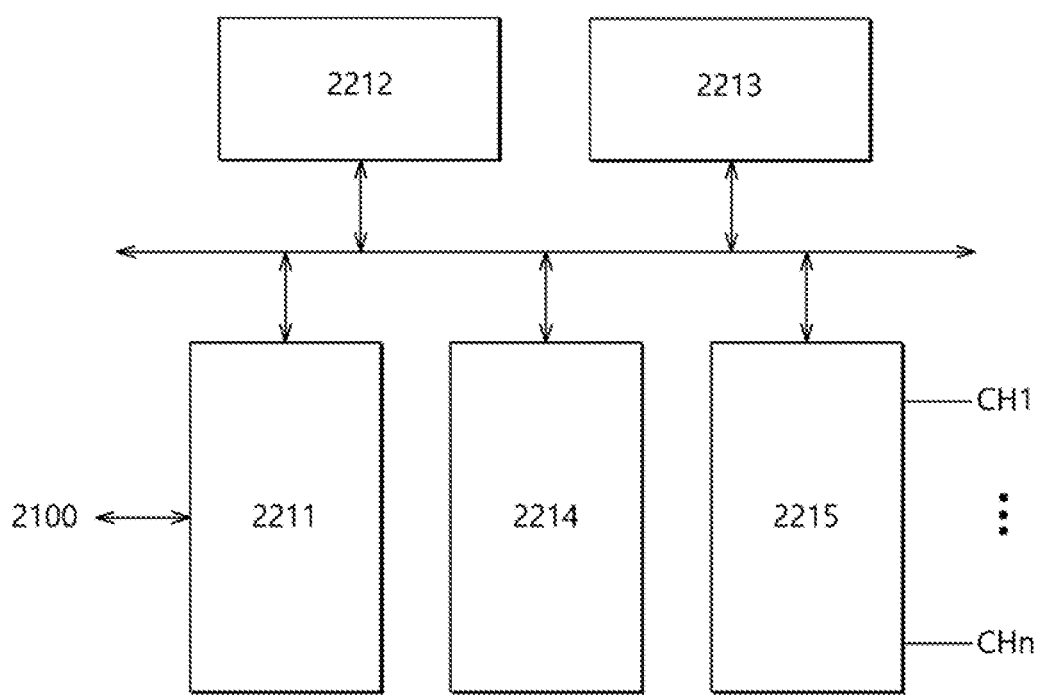
FIG. 7 is a diagram illustrating an example of a controller illustrated in FIG. 6.

FIG. 7 is a diagram illustrating an example of the controller 2210 of FIG. 6. Referring to FIG. 7, the controller 2210 may include a host interface unit 2211, a control unit 2212, a random access memory (RAM) 2213, an error correction code (ECC) unit 2214, and a memory interface unit 2215.

The host interface unit 2211 may perform interfacing between the host apparatus 2100 and the SSD 2200 according to a protocol of the host apparatus 2100. For example, the host interface unit 2211 may communicate with the host apparatus 2100 through any one among a secure digital protocol, a universal serial bus (USB) protocol, a multimedia card (MMC) protocol, an embedded MMC (eMMC) protocol, a personal computer memory card international association (PCMCIA) protocol, a parallel advanced technology attachment (PATA) protocol, a serial advanced technology attachment (SATA) protocol, a small computer system interface (SCSI) protocol, a serial attached SCSI (SAS) protocol, a peripheral component interconnection (PCI) protocol, a PCI Express (PCI-E) protocol, and a universal flash storage (UFS) protocol. The host interface unit 2211 may perform a disc emulation function so that the host apparatus 2100 recognizes the SSD 2200 as a general-purpose data storage apparatus, for example, a hard disc drive HDD.

The control unit 2212 may analyze and process the signal SGL input from the host apparatus 2100. The control unit 2212 may control operations of internal functional blocks according to firmware and/or software for driving the SDD 2200. The RAM 2213 may be operated as a working memory for driving the firmware or software.

The ECC unit 2214 may generate parity data for the data to be transferred to the nonvolatile memory devices 2231 to 223n. The generated parity data may be stored in the nonvolatile memory devices 2231 to 223n together with the data. The ECC unit 2214 may detect errors for data read from the nonvolatile memory devices 2231 to 223n based on the parity data. When detected errors are within a correctable range, the ECC unit 2214 may correct the detected errors.

The memory interface unit 2215 may provide a control signal such as a command and an address to the nonvolatile memory devices 2231 to 223n according to control of the control unit 2212. The memory interface unit 2215 may exchange data with the nonvolatile memory devices 2231 to 223n according to control of the control unit 2212. For example, the memory interface unit 2215 may provide data stored in the buffer memory device 2220 to the nonvolatile memory devices 2231 to 223n or provide data read from the nonvolatile memory devices 2231 to 223n to the buffer memory device 2220.

Figure 8:
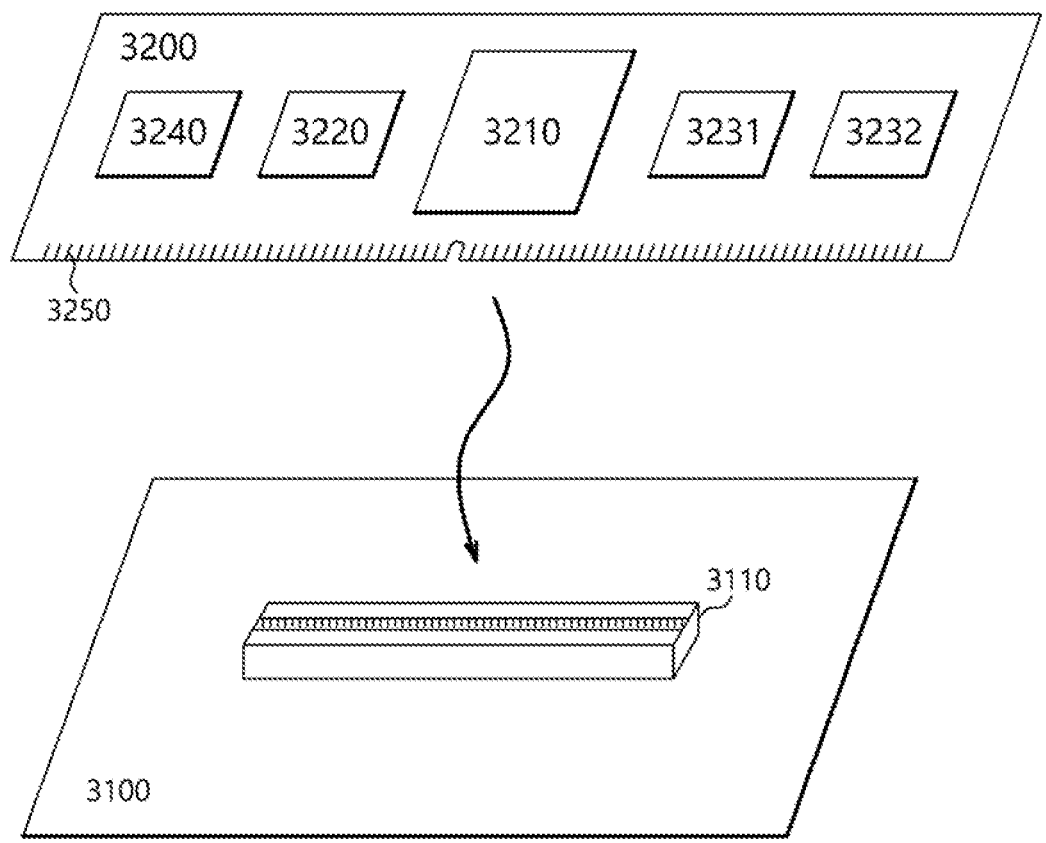
FIG. 8 is a diagram illustrating an example of a data processing system including a data storage apparatus in accordance with an embodiment of the present disclosure.

FIG. 8 is a diagram illustrating an example of a data processing system including a data storage apparatus in accordance with an embodiment of the present disclosure. Referring to FIG. 8, a data processing system 3000 may include a host apparatus 3100 and a data storage apparatus 3200.

The host apparatus 3100 may be configured in a board form such as a printed circuit board (PCB). Although not shown in FIG. 7, the host apparatus 3100 may include internal functional blocks that perform functions of the host apparatus 3100.

The host apparatus 3100 may include a connection terminal 3110 such as a socket, a slot, or a connector. The data storage apparatus 3200 may be mounted on the connection terminal 3110.

The data storage apparatus 3200 may be configured in a board form such as a PCB. The data storage apparatus 3200 may refer to a memory module or a memory card. The data storage apparatus 3200 may include a controller 3210, a buffer memory device 3220, nonvolatile memory devices 3231 and 3232, a power management integrated circuit (PMIC) 3240, and a connection terminal 3250.

The controller 3210 may control an overall operation of the data storage apparatus 3200. The controller 3210 may be configured in substantially the same manner as the controller 2210 illustrated in FIG. 6.

The buffer memory device 3220 may temporarily store data to be stored in the nonvolatile memory devices 3231 and 3232. The buffer memory device 3220 may temporarily store data read from the nonvolatile memory devices 3231 and 3232. The data temporarily stored in the buffer memory device 3220 may be transmitted to the host apparatus 3100 or the nonvolatile memory devices 3231 and 3232 according to control of the controller 3210.

The nonvolatile memory devices 3231 and 3232 may be used as a storage medium of the data storage apparatus 3200.

The PMIC 3240 may provide power input through the connection terminal 3250 to the inside of the data storage apparatus 3200. The PMIC 3240 may manage the power of the data storage apparatus 3200 according to control of the controller 3210.

The connection terminal 3250 may be coupled to the connection terminal 3110 of the host apparatus 3100. A signal such as a command, an address, data, and power may be transmitted between the host apparatus 3100 and the data storage apparatus 3200 through the connection terminal 3250. The connection terminal 3250 may be configured in various forms according to an interfacing method between the host apparatus 3100 and the data storage apparatus 3200. The connection terminal 3250 may be arranged in any one side of the data storage apparatus 3200.

Figure 9:
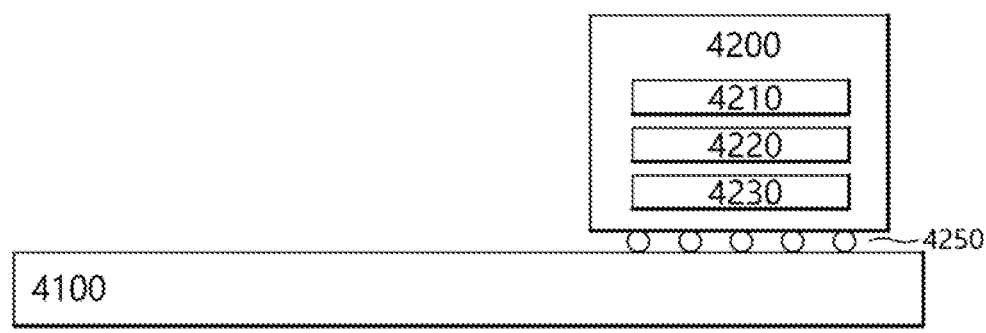
FIG. 9 is a diagram illustrating an example of a data processing system including a data storage apparatus in accordance with an embodiment of the present disclosure.

FIG. 9 is a diagram illustrating an example of a data processing system including a data storage apparatus in accordance with an embodiment of the present disclosure. Referring to FIG. 9, a data processing system 4000 may include a host apparatus 4100 and a data storage apparatus 4200.

The host apparatus 4100 may be configured in a board form such as a PCB. Although not shown in FIG. 9, the host apparatus 4100 may include internal functional blocks configured to perform functions of the host apparatus 4100.

The data storage apparatus 4200 may be configured in a surface mounting packaging form. The data storage apparatus 4200 may be mounted on the host apparatus 4100 through a solder ball 4250. The data storage apparatus 4200 may include a controller 4210, a buffer memory device 4220, and a nonvolatile memory device 4230.

The controller 4210 may control an overall operation of the data storage apparatus 4200. The controller 4210 may be configured in substantially the same manner as the controller 2210 illustrated in FIG. 6.

The buffer memory device 4220 may temporarily store data to be stored in the nonvolatile memory device 4230. The buffer memory device 4220 may temporarily store data read from the nonvolatile memory device 4230. The data temporarily stored in the buffer memory device 4220 may be transmitted to the host apparatus 4100 or the nonvolatile memory device 4230 through control of the controller 4210.

The nonvolatile memory device 4230 may be used as a storage medium of the data storage apparatus 4200.

Figure 10:
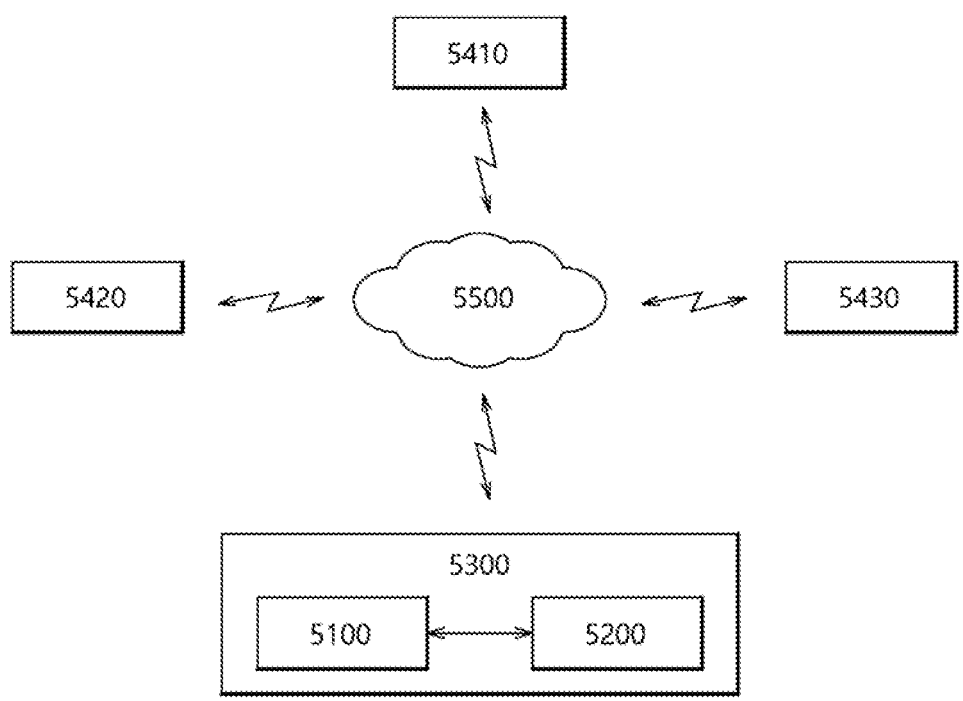
FIG. 10 is a diagram illustrating an example of a network system including a data storage apparatus in accordance with an embodiment of the present disclosure.

FIG. 10 is a diagram illustrating an example of a network system 5000 including a data storage apparatus in accordance with an embodiment of the present disclosure. Referring to FIG. 10, the network system 5000 may include a server system 5300 and a plurality of client systems 5410 to 5430 which are coupled through a network 5500.

The server system 5300 may serve data in response to requests of the plurality of client systems 5410 to 5430. For example, the server system 5300 may store data provided from the plurality of client systems 5410 to 5430. In another example, the server system 5300 may provide data to the plurality of client systems 5410 to 5430.

The server system 5300 may include a host apparatus 5100 and a data storage apparatus 5200. The data storage apparatus 5200 may be configured in substantially the same manner as the data storage apparatus 10 of FIG. 1, the data storage apparatus 2200 of FIG. 6, the data storage apparatus 3200 of FIG. 8, or the data storage apparatus 4200 of FIG. 9.

Figure 11:
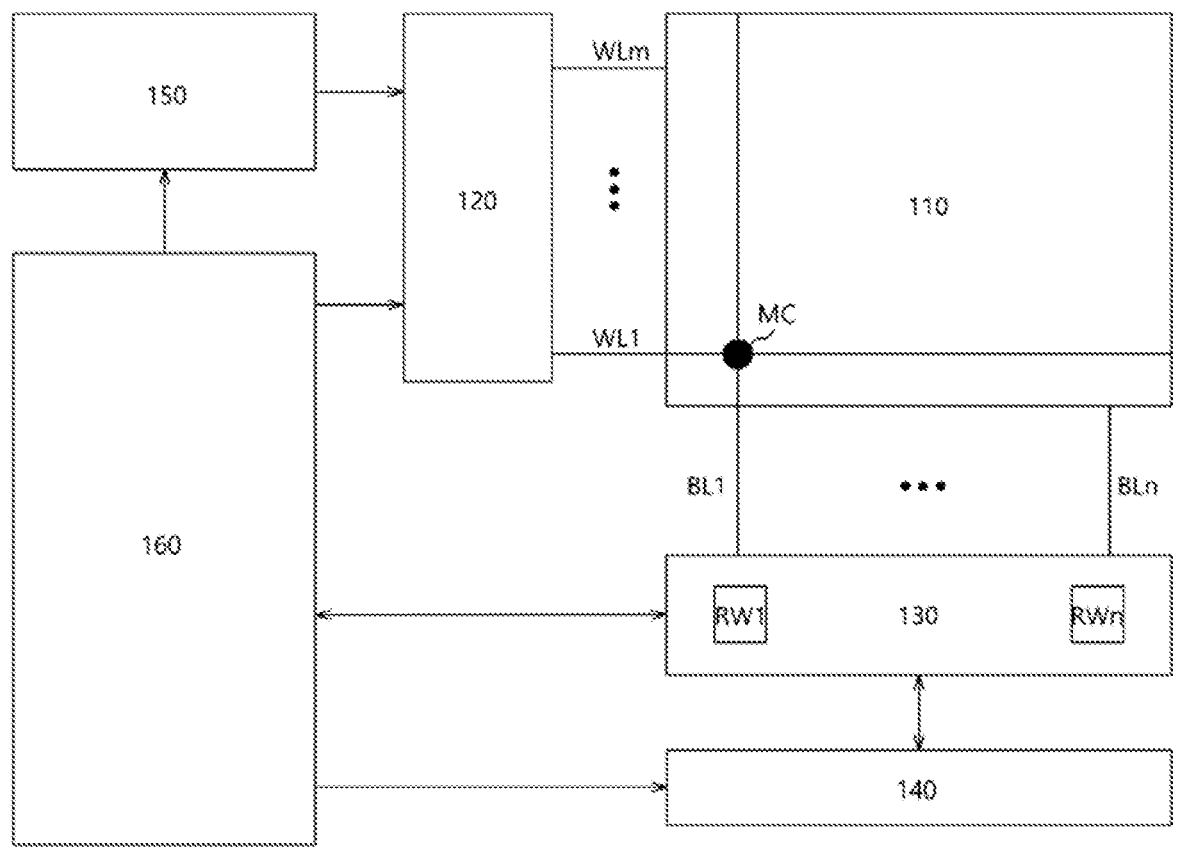
FIG. 11 is a block diagram illustrating an example of a nonvolatile memory device in a data storage apparatus in accordance with an embodiment of the present disclosure.

FIG. 11 is a block diagram illustrating an example of a nonvolatile memory device included in a data storage apparatus in accordance with an embodiment of the present disclosure. Referring to FIG. 11, a nonvolatile memory device 100 may include a memory cell array 110, a row decoder 120, a column decoder 140, a data read/write block 130, a voltage generator 150, and a control logic 160.

The memory cell array 110 may include memory cells MC arranged in regions in which word lines WL1 to WLm and bit lines BL1 to BLn cross to each other.

The row decoder 120 may be coupled to the memory cell array 110 through the word lines WL1 to WLm. The row decoder 120 may operate through control of the control logic 160. The row decoder 120 may decode an address provided from an external apparatus (not shown). The row decoder 120 may select and drive the word lines WL1 to WLm based on a decoding result. For example, the row decoder 120 may provide a word line voltage provided from the voltage generator 150 to the word lines WL1 to WLm.

The data read/write block 130 may be coupled to the memory cell array 110 through the bit lines BL1 to BLn. The data read/write block 130 may include read/write circuits RW1 to RWn corresponding to the bit lines BL1 to BLn. The data read/write block 130 may operate according to control of the control logic 160. The data read/write block 130 may operate as a write driver or a sense amplifier according to an operation mode. For example, the data read/write block 130 may operate as the write driver capable of storing data provided from an external apparatus in the memory cell array 110 in a write operation. In another example, the data read/write block 130 may operate as the sense amplifier capable of reading data from the memory cell array 110 in a read operation.

The column decoder 140 may operate though control of the control logic 160. The column decoder 140 may decode an address provided from an external apparatus (not shown). The column decoder 140 may couple the read/write circuits RW1 to RWn of the data read/write block 130 corresponding to the bit lines BL1 to BLn and data input/output (I/O) lines (or data I/O buffers) based on a decoding result.

The voltage generator 150 may generate voltages used for an internal operation of the nonvolatile memory device 100. The voltages generated through the voltage generator 150 may be applied to the memory cells of the memory cell array 110. For example, a program voltage generated in a program operation may be applied to word lines of memory cells in which the program operation is to be performed. In another example, an erase voltage generated in an erase operation may be applied to well regions of memory cells in which the erase operation is to be performed. In another example, a read voltage generated in a read operation may be applied to word lines of memory cells in which the read operation is to be performed.

The control logic 160 may control an overall operation of the nonvolatile memory device 100 based on a control signal provided from an external apparatus. For example, the control logic 160 may control an operation of the nonvolatile memory device 100 such as a read operation, a write operation, or an erase operation of the nonvolatile memory device 100.

While various embodiments have been described above, it will be understood to those skilled in the art that the embodiments described are examples only. Accordingly, the data storage device and the operating method thereof described herein should not be limited based on the described embodiments.

What is claimed is:

1. A data storage device comprising:
    a nonvolatile memory device;
    a random access memory including a plurality of buffers for temporarily storing data; and
    a controller suitable for, when a program fail occurs in the nonvolatile memory device, selecting one of the plurality of the buffers as an exchange buffer, transmitting exchange data stored in the exchange buffer to the nonvolatile memory device to exchange the exchange data with failed program data in the nonvolatile memory device, storing the failed program data in the exchange buffer, updating the failed program data by modifying meta information on the failed program data stored in the exchange buffer, and transmitting the updated program data in the exchange buffer to the nonvolatile memory device to exchange the updated program data with the exchange data in the nonvolatile memory device.

2. The data storage device according to claim 1, wherein the nonvolatile memory device comprises:
    a memory cell array;
    a page buffer group suitable for temporarily storing data to be programmed in the memory cell array or data read out from the memory cell array; and
    a control logic suitable for controlling a program operation and a read operation to be performed in the memory cell array, under control of the controller.

3. The data storage device according to claim 2, wherein the page buffer group comprises:
    a first page buffer disposed adjacent to the memory cell array; and
    a second page buffer disposed adjacent to the first page buffer.

4. The data storage device according to claim 3,
    wherein the failed program data is stored in the first page buffer, and the exchange data transmitted from the controller is stored in the second page buffer, and
    wherein the control logic swaps the exchange data stored in the second page buffer and the failed program data stored in the first page buffer, and transmits the failed program data moved to the second page buffer to the controller.

5. The data storage device according to claim 4,
    wherein the exchange data is stored in the first page buffer, and the updated program data transmitted from the controller is stored in the second page buffer, and
    wherein the control logic swaps the updated program data stored in the second page buffer and the exchange data stored in the first page buffer, and transmits the exchange data moved to the second page buffer to the controller.

6. The data storage device according to claim 5, wherein the control logic, in response to swapping commands received from the controller, swaps the exchange data and the failed program data, and swaps the updated program data and the exchange data.

7. The data storage device according to claim 5, wherein the controller stores the exchange data received from the nonvolatile memory device, again in the exchange buffer.

8. The data storage device according to claim 5, wherein the control logic reprograms the updated program data stored in the first page buffer, in a block other than a block in which the program fail has occurred, under control of the controller.

9. A method for operating a data storage device, comprising:
   determining whether a program fail has occurred in a nonvolatile memory device;
   selecting one of the plurality of the buffers included in a controller as an exchange buffer when the program fail has occurred;
   exchanging exchange data stored in the exchange buffer with failed program data stored in the nonvolatile memory device;
   updating the failed program data by modifying meta information on the failed program data;
   exchanging updated program data with the exchange data stored in the nonvolatile memory device; and
   performing reprogram by using the updated program data.

10. The method according to claim 9,
    wherein the nonvolatile memory device includes a first page buffer suitable for storing failed program data and a second page buffer which is empty, and
    wherein the exchanging of the exchange data with the failed program data comprises:
    storing the exchange data in the second page buffer of the nonvolatile memory device;
    swapping the failed program data stored in the first page buffer and the exchange data stored in the second page buffer;
    receiving the failed program data moved to the second page buffer from the nonvolatile memory device; and
    storing the received failed program data in the exchange buffer.

11. The method according to claim 9,
    wherein the nonvolatile memory device includes a first page buffer suitable for storing the exchange data and a second page buffer which is empty, and
    wherein the exchanging of the updated program data with the exchange data comprises:
    storing the updated program data in the second page buffer;
    swapping the exchange data stored in the first page buffer and the updated program data stored in the second page buffer; and
    receiving the exchange data moved to the second page buffer from the nonvolatile memory device.

12. The method according to claim 11, further comprising storing the received exchange data again in the exchange buffer.

13. The method according to claim 9, wherein the performing of the reprogram is performed in a block other than a block in which the program fail has occurred, in the nonvolatile memory device.

14. A method for operating a data storage device including a nonvolatile memory device including a memory cell array and a page buffer, and a controller including a buffer memory, the method comprising:
    exchanging a failed program data in the page buffer with an exchange data selected among data in the buffer memory;
    updating the failed program data stored in the buffer memory by modifying meta information on the failed program data; and
    reprograming the updated program data into the memory cell array by exchanging the updated program data with the exchange data in the page buffer.

15. The method according to claim 14, wherein the reprograming of the updated program data is performed in a block other than a block in which the program fail has occurred, in the nonvolatile memory device.

\* \* \* \* \*